United States Patent
Bucharzewski et al.

(10) Patent No.: US 9,433,152 B2
(45) Date of Patent: Sep. 6, 2016

(54) CASTER WHEEL ASSEMBLY OF A PICKUP FOR AN AGRICULTURAL MACHINE

(71) Applicant: CNH Industrial America LLC, New Holland, PA (US)

(72) Inventors: Marek Bucharzewski, Plock (PL); Mariusz Choluj, Plock (PL); Rafal Domalewski, Brugge (BE); Robrecht M. K. Dumarey, Gistel (BE); Pawel Krasniewski, Bielsk (PL); Andrzej Okrasko, Nowe Gulczewo (PL); Lukasz Szyjkowski, Plock (PL); Lukasz Ziembicki, Iłów (PL)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/432,954

(22) PCT Filed: Sep. 27, 2013

(86) PCT No.: PCT/EP2013/070295
§ 371 (c)(1),
(2) Date: Apr. 1, 2015

(87) PCT Pub. No.: WO2014/053425
PCT Pub. Date: Apr. 10, 2014

(65) Prior Publication Data
US 2015/0237802 A1     Aug. 27, 2015

(30) Foreign Application Priority Data
Oct. 1, 2012 (BE) .................................. 2012/0651

(51) Int. Cl.
*B60B 33/06* (2006.01)
*A01D 89/00* (2006.01)
*B60B 33/00* (2006.01)

(52) U.S. Cl.
CPC ......... *A01D 89/004* (2013.01); *B60B 33/0005* (2013.01); *B60B 33/006* (2013.01);
(Continued)

(58) Field of Classification Search
CPC . Y10T 16/195; Y10T 16/196; A01D 89/004; A61G 2005/1051; A61G 2007/0528; B60B 33/0005; B60B 33/0055; B60B 33/0057; B60B 33/006; B60B 33/0065; B60B 33/0068; B60B 33/0073; B60B 33/0076; B60B 33/02; B60G 2200/445; B62B 3/001; B62B 2301/00; B62B 2301/04; B62B 2301/046; B62B 2301/0465
See application file for complete search history.

(56) References Cited

U.S. PATENT DOCUMENTS 2,179,877 A * 11/1939 Martin ..................... B64C 25/50
244/109
2,388,874 A * 11/1945 Seaholm ................... A01C 7/18
16/35 D (Continued)

FOREIGN PATENT DOCUMENTS

EP         2113396 A1     11/2009

*Primary Examiner* — Chuck Mah
(74) *Attorney, Agent, or Firm* — Patrick M. Sheldrake

(57) ABSTRACT

A caster wheel assembly of a pickup for an agricultural machine, comprising a wheel on a carrier shaft mounted rotatably within a bushing of a pickup arm. The wheel being biased by a spring to be oriented in a predetermined direction relative to the pickup arm. The spring is mounted over the pickup arm between a first arm fixed to the carrier shaft and a second arm fixed to the pickup arm.

7 Claims, 2 Drawing Sheets

(52) U.S. Cl.
CPC ....... *B60B33/0015* (2013.01); *B60B 33/0021* (2013.01); *B60B 33/0039* (2013.01); *B60B 33/0049* (2013.01); *B60B 33/0068* (2013.01); *B60B 33/0073* (2013.01); *B60B 2900/351* (2013.01); *B60B 2900/721* (2013.01); *B60Y 2200/22* (2013.01); *Y10T 16/18* (2015.01)

(56) References Cited

U.S. PATENT DOCUMENTS

| | | | | |
|---|---|---|---|---|
| 2,557,275 | A * | 6/1951 | Geisse | B64C 25/50 16/35 D |
| 2,960,815 | A * | 11/1960 | Van Der Lely | A01D 78/148 280/29 |
| 3,075,233 | A * | 1/1963 | Lorenz | B60B 33/02 16/35 D |
| 3,276,788 | A * | 10/1966 | Sackler | B62D 13/06 16/19 |
| 4,154,451 | A | 5/1979 | Young | |
| 4,212,093 | A * | 7/1980 | Lombard | A63C 17/0033 16/35 D |
| 4,324,093 | A * | 4/1982 | van der Lely | A01D 78/148 56/377 |
| 4,346,909 | A * | 8/1982 | Hundeby | A01B 73/005 172/248 |
| 4,410,194 | A * | 10/1983 | Steilen | B60B 33/02 16/35 D |
| 4,679,662 | A * | 7/1987 | Nordskog | B60B 33/0028 16/35 R |
| 5,221,100 | A * | 6/1993 | McNutt | B62D 63/067 16/35 D |
| 5,984,328 | A * | 11/1999 | Tipton | A63C 17/0033 280/7.14 |
| 6,659,491 | B2 * | 12/2003 | Green | B62D 63/065 280/423.1 |
| 6,810,653 | B2 | 11/2004 | Derscheid | |
| 7,784,833 | B2 * | 8/2010 | Tsuchie | A63C 17/004 280/11.19 |
| 8,020,648 | B2 * | 9/2011 | Otto | B60B 33/045 180/6.48 |
| 2005/0115746 | A1 * | 6/2005 | Dunn | B60B 35/003 180/6.2 |
| 2009/0152828 | A1 * | 6/2009 | Bebernes | B62D 5/09 280/86 |
| 2013/0305683 | A1 | 11/2013 | Ziembicki | |

* cited by examiner

CASTER WHEEL ASSEMBLY OF A PICKUP FOR AN AGRICULTURAL MACHINE

This application is the US National Stage filing of International Application Serial No. PCT/EP2013/070295 filed on Sep. 27, 2013 which claims priority to Belgian Application BE2012/0651 filed Oct. 1, 2012, each of which is incorporated herein by reference in its entirety.

FIELD OF THE INVENTION

The present invention relates to a caster wheel assembly of a pickup which can be used with an agricultural machine such as a round baler, a square baler, a forage harvester or a combine harvester.

BACKGROUND OF THE INVENTION

Certain agricultural machines, such as balers and forage harvesters, are required to pick up crop material that has been cut but still lies on the ground. The mechanism used to gather the crop material from the ground and feed it into the machine for processing is known as, and herein referred to as, a pickup. A pickup typically comprises a drum rotatably mounted on a frame and having radially projecting tines to drive the crop material upwards, past a guide (also known as a windguard) and then into a feed channel through which the crop material is conveyed into the machine for processing. The construction of the pickup is not of importance to the present invention and has been described only by way of general background.

It is known for a pickup to be supported on two ground wheels and these may be adjustable in order to allow the ground clearance to be adjusted. As the ground wheels are provided only for support, and are not used for steering, they are commonly designed as caster wheels so that they align themselves automatically with the direction of travel of the machine. As is known, a caster wheel is pivotable about a generally vertical axis, generally known as and herein referred to as a caster axis. Typically, the point of contact of the wheel with the ground is offset from the caster axis. As a result, drag rotates the wheel such that its point of contact with the ground always lines up behind the caster axis in the direction of travel thereby causing the wheel to point automatically in the correct direction.

A problem arises with this wheel design when the pickup is transported on public roads with the wheels raised off the ground. When they are not in contact with the ground, the caster wheels can rotate freely and can move to a position where they project laterally beyond the sides of the pickup. In such a position, they may increase the width of the pickup beyond legally permissible limits for transportation on a public highway.

EP 1 362 506 discloses a crop pickup arrangement and height gauge arrangement, in which on the one hand, a skid shoe and on the other hand, a wheel are attached to a pivot arm assembly. The wheel is supported by the assembly for rotation about a horizontal axis and the assembly is itself mounted on the pickup to pivot about a second horizontal axis. This arrangement, which acts in the same way as a motorcycle swinging arm suspension, allows height adjustment of the wheel but the wheel has no caster action and does not align automatically with the direction of travel.

EP 2 113 396 discloses a pickup support wheel mounted on a carrier secured to a pivot shaft that defines the caster axis of the wheel. The pivot shaft can rise and fall relative to the frame of the pickup and, when it falls to the limit of its travel, a pin projecting from the pivot shaft interacts with a cam surface to cause the wheel to rotate into a desired position. However, during normal operation of the pickup there is no interaction between the pin and the cam.

WO 2012/072436 discloses a pickup for an agricultural machine having a frame carrying a pickup mechanism and supported on the ground by means of two support wheels, wherein each support wheel is mounted for rotation about a generally horizontal axis on a carrier that is connected to the frame of the pickup for rotation about a generally vertical caster axis, the projection of the caster axis intersecting the ground at a point offset from the point of contact of the wheel with the ground. Each carrier is connected by a respective spring to a point fixed relative to the frame of the pickup, the spring biasing the carrier to cause the support wheel to be oriented in a predetermined direction relative to the frame of the pickup. In the presented embodiment, the spring is mounted below an arm of the frame of the pickup. When the support wheels are raised from the ground the springs acting on their carriers bias them into their predetermined direction, also known as the parked position, in which they do not project impermissibly beyond the frame of the pickup. However, the spring is attached such that it limits the range of rotation of the wheel. In particular, the wheel is not able to rotate substantially more than 180 degrees from its initial position, which may cause problems when manoeuvring backwards on an uneven terrain, when the wheel is biased to a position rotated 180 degrees with respect to the bias position when manoeuvring forwards.

Therefore, there is a need for an improved caster wheel assembly of a pickup for an agricultural machine which will bias the wheel to a predetermined direction, but provide greater freedom of rotation of the wheel while manoeuvring forwards and backwards.

SUMMARY OF THE INVENTION

The object of the invention is a caster wheel assembly of a pickup for an agricultural machine, comprising a wheel on a carrier shaft mounted rotatably within a bushing of a pickup arm, the wheel being biased by a spring to be oriented in a predetermined direction relative to the pickup arm, characterized in that the spring is mounted over the pickup arm between a first arm fixed to the carrier shaft and a second arm fixed to the pickup arm.

Preferably, the spring is mounted to a protrusion extending above the first arm.

Preferably, the point of connection of the spring to the first arm is arranged at a height (h) above the pickup arm lower than the height (H) of the point of connection of the spring to the second arm.

Preferably, the first arm is a rod.

Preferably, first arm is a plate.

Preferably, the spring is mounted releasably to the arms.

Preferably, the point of contact between the wheel and the ground lies in line with the projection of the axis of the carrier shaft.

Preferably, the point of contact between the wheel and the ground is offset from the point (29A) of the projection of the axis of the carrier shaft onto the ground.

The caster wheel assembly according to the invention aligns the caster wheel during road transport to a desired position and it allows adjustment of the wheel orientation by 360 degrees when manoeuvring the pickup both forwards and backwards.

Particular and preferred aspects of the invention are set out in the accompanying independent and dependent claims.

Features from the dependent claims may be combined with features of other dependent claims as appropriate and not merely as explicitly set out in the claims.

BRIEF DESCRIPTION OF THE DRAWINGS

The object of the invention is shown by means of exemplary embodiment on the drawings, in which.

DETAILED DESCRIPTION OF THE INVENTION

Figure 1:
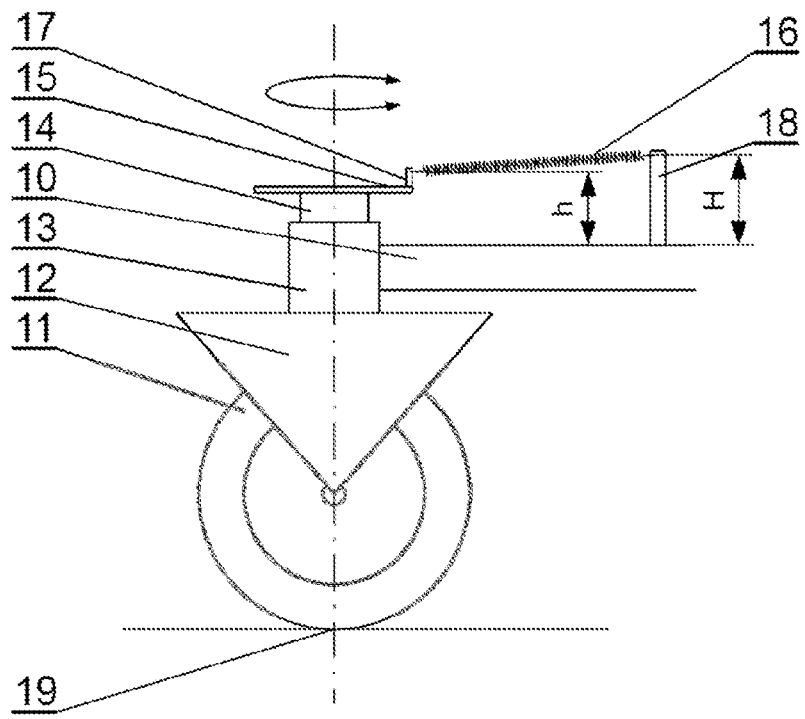
FIG. 1 shows a side view of a first embodiment the caster wheel assembly, with the wheel arranged straight.
Figure 2:
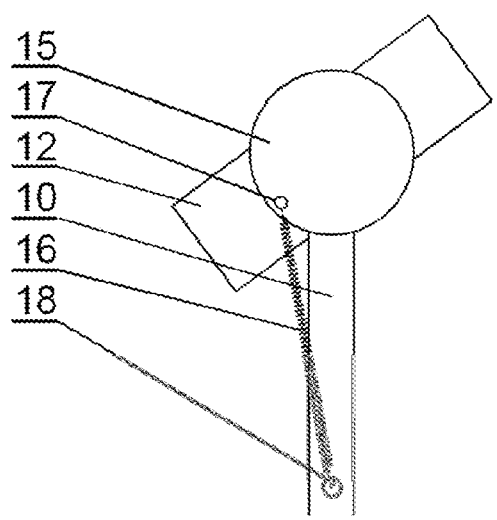
FIG. 2 shows a top view of the first embodiment with the wheel turned.

The caster wheel assembly as shown in FIGS. 1 and 2 comprises a wheel 11 mounted on a carrier 12 with a carrier shaft 14 that is rotatably mounted in a bushing 13 fixed to a pickup arm 10. The pickup arm 10 forms part of the frame of the pickup. The pickup arm 10 can be pivoted to alter the ride height of the pickup.

As shown in the first embodiment of FIG. 1, the point of contact 19 between the wheel 11 and the ground lies in line with the projection of the axis of the carrier shaft 14. This reduces the force necessary to bias the wheel 11 in the direction of travel.

A spring 16 is mounted above the pickup arm 10. The first end of the spring 16 is attached to a first arm 15 fixed to the carrier shaft 14. The first arm 15 can be a rod or, as shown in FIG. 2, a plate, which provides greater stiffness and stability than a rod. The first end of the spring 16 is mounted to the first arm 15 at a point offset from the carrier shaft 14. Preferably, the first end of the spring 16 is mounted to a protrusion 17 of the first arm 15 extending above the top of the shaft 14. The second end of the spring 16 is attached to a second arm 18 fixed to the pickup arm 10. Preferably, the second end of the spring 16 is attached at a height H above the pickup arm 10 which is greater than the height h of attachment of the first end of the spring 16 to the first arm 15, so that the spring does not collide with the first arm for substantial angles of rotation of the wheel.

The spring 16 biases wheel 11 to be oriented in a predetermined direction relative to the pickup arm 10, depending on the arrangement of the first arm 15 and the second arm 18. Preferably, the first arm 15 and the second arm 18 are arranged such that the spring 16 is configured to bias the wheel 11 such that it steers the pickup to travel in a straight line.

The spring 16 allows rotation of the wheel 11 by an arbitrary angle. As the wheel rotates towards 180 degrees from its initial position indicated in FIG. 1, the spring extends and upon rotation by a further angle, the spring contracts. The caster wheel assembly allows the wheel to rotate 360 degrees around the carrier axis 14, thereby facilitating manoeuvring the pickup both forwards and backwards. At the same time, the spring 16 aligns the caster wheel 11 during road transport to a desired position.

Figure 3:
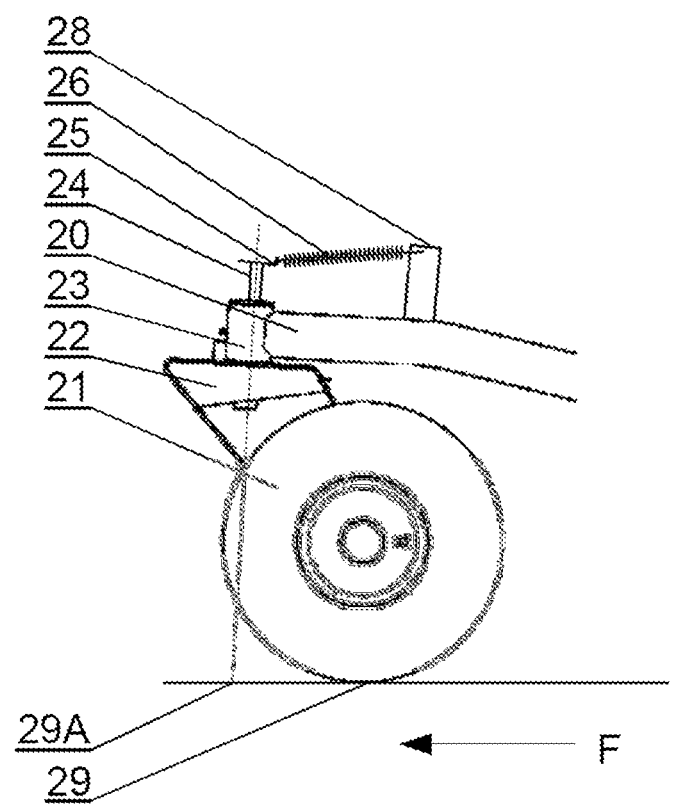
FIG. 3 shows a side view of a second embodiment of the caster wheel assembly.

FIG. 3 shows a second embodiment, wherein the wheel 21 is mounted on a carrier 22 with a shaft 24 that is rotatably mounted in a bushing 23 fixed to a pickup arm 20, but as compared to FIG. 1, the point of contact 29 between the wheel 21 and the ground is offset from the point 29A of the projection of the axis of the carrier shaft 24 onto the ground. As a result, the wheel 21 always lines up behind the carrier shaft 24 in the direction of travel, which is designated by the arrow F. The spring 26 is arranged over the pickup arm 20 between the first arm 25 and the second arm 28 in a manner equivalent to that shown in FIG. 1.

It is to be understood that the presented embodiments describe only the most characteristic features of the invention. A skilled person will realize that various modifications may be made to the presented embodiments, such as implementing the features known from other caster wheel assemblies of pickup mechanisms related to the configuration of the pickup arm, the mounting of the carrier shaft within the bushing etc.

The invention claimed is:

1. A caster wheel assembly of a pickup for an agricultural machine, comprising:
a wheel on a carrier shaft mounted rotatably within a bushing of a pickup arm, the wheel biased by a spring to be oriented in a predetermined direction relative to the pickup arm, wherein the spring is mounted over the pickup arm between a first arm fixed to the carrier shaft and a second arm fixed to the pickup arm, wherein the point of connection of the spring to the first arm is arranged at a height above the pickup arm lower than the height of the point of connection of the spring to the second arm.

2. The caster wheel assembly according to claim 1, wherein the spring is mounted to a protrusion extending above the first arm.

3. The caster wheel assembly according to claim 1, wherein the first arm is a rod.

4. The caster wheel assembly according to claim 1, wherein the first arm is a plate.

5. The caster wheel assembly according to claim 1, wherein the spring is mounted releasably to the arms.

6. The caster wheel assembly according to claim 1, wherein a point of contact between the wheel and the ground lies in line with a projection of an axis of the carrier shaft.

7. The caster wheel assembly according to claim 1, wherein a point of contact between the wheel and the ground is offset from a point of a projection of an axis of the carrier shaft onto the ground.

* * * * *